United States Patent
Avanes et al.

(10) Patent No.: US 11,841,969 B2
(45) Date of Patent: *Dec. 12, 2023

(54) CONTAINER-CENTRIC ACCESS CONTROL ON DATABASE OBJECTS

(71) Applicant: Snowflake Inc., Bozeman, MT (US)

(72) Inventors: Artin Avanes, Palo Alto, CA (US); Khalid Zaman Bijon, Santa Cruz, CA (US); Peter Povinec, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/057,878

(22) Filed: Nov. 22, 2022

(65) Prior Publication Data

US 2023/0089449 A1  Mar. 23, 2023

Related U.S. Application Data

(63) Continuation of application No. 17/657,578, filed on Mar. 31, 2022, now Pat. No. 11,544,399, which is a
(Continued)

(51) Int. Cl.
  *G06F 16/00* (2019.01)
  *G06F 21/62* (2013.01)
  *G06F 16/27* (2019.01)

(52) U.S. Cl.
  CPC .......... *G06F 21/6218* (2013.01); *G06F 16/27* (2019.01)

(58) Field of Classification Search
  None
  See application file for complete search history.

(56) References Cited

U.S. PATENT DOCUMENTS 5,572,673 A * 11/1996 Shurts ................. G06F 21/6218
  726/17
5,778,350 A  7/1998 Adams et al.
(Continued)

FOREIGN PATENT DOCUMENTS

CN  104781809  7/2015
CN  104866513  8/2015
(Continued)

OTHER PUBLICATIONS

"European Application Serial No. 20914306.4, Response to Communication pursuant to Rules 161 and 162 filed Feb. 17, 2023", 13 pgs.
(Continued)

*Primary Examiner* — Hasanul Mobin
(74) *Attorney, Agent, or Firm* — Schwegman Lundberg & Woessner, P.A.

(57) ABSTRACT

Using container-centric managed access, an administrator is enabled to define a set of future grants for each object that will be created in the future in a container managed by the administrator. When a user creates a database object, the system checks the future grants to determine if any apply to the user, the database object, or the combination. Any applicable future grants are applied to the database object before the user is allowed to modify it. As a result, the administrator is enabled to control the privileges associated with the database object even before the database object is created, while restricting individual object owners from managing privileges on their owned objects.

20 Claims, 8 Drawing Sheets

Related U.S. Application Data continuation of application No. 16/745,922, filed on Jan. 17, 2020, now Pat. No. 11,372,995.

(56) References Cited

U.S. PATENT DOCUMENTS

| | | | |
|---|---|---|---|
| 5,798,506 A * | 8/1998 | Thiriet | G06Q 20/4093 235/492 |
| 6,038,563 A * | 3/2000 | Bapat | G06F 1/00 707/999.009 |
| 6,954,797 B1 | 10/2005 | Takeda et al. | |
| 7,010,580 B1 * | 3/2006 | Fu | G06F 21/6218 709/217 |
| 7,051,039 B1 * | 5/2006 | Murthy | G06F 21/6227 707/999.005 |
| 7,467,414 B2 | 12/2008 | Schlesinger | |
| 7,506,357 B1 * | 3/2009 | Moriconi | H04L 63/1408 726/1 |
| 7,797,276 B1 | 9/2010 | Yang | |
| 7,865,959 B1 * | 1/2011 | Lewis | G06F 21/6218 726/17 |
| 9,754,119 B1 * | 9/2017 | Kilday | G06F 21/62 |
| 10,277,601 B1 | 4/2019 | Higgins et al. | |
| 10,430,605 B1 | 10/2019 | Nerurkar et al. | |
| 11,341,828 B2 * | 5/2022 | Shakedd | G08B 13/2448 |
| 11,372,995 B2 | 6/2022 | Avanes et al. | |
| 11,544,399 B2 | 1/2023 | Avanes et al. | |
| 2006/0137019 A1 | 6/2006 | Dettinger et al. | |
| 2006/0285535 A1 | 12/2006 | Metcalf et al. | |
| 2008/0010233 A1 | 1/2008 | Sack et al. | |
| 2008/0282354 A1 * | 11/2008 | Wobber | G06F 21/6218 726/26 |
| 2011/0242974 A1 | 10/2011 | Das et al. | |
| 2012/0246115 A1 | 9/2012 | King et al. | |
| 2012/0330925 A1 | 12/2012 | Ramamurthy et al. | |
| 2013/0067594 A1 | 3/2013 | Kantor et al. | |
| 2013/0262424 A1 | 10/2013 | Cain, III et al. | |
| 2014/0101644 A1 | 4/2014 | Buzaski et al. | |
| 2015/0200945 A1 * | 7/2015 | Edson | H04L 65/403 726/28 |
| 2016/0012465 A1 | 1/2016 | Sharp | |
| 2016/0188617 A1 * | 6/2016 | Gaikwad | G06F 21/6218 707/785 |
| 2017/0200122 A1 * | 7/2017 | Edson | H04L 63/104 |
| 2017/0324740 A1 | 11/2017 | Mao et al. | |
| 2017/0331826 A1 | 11/2017 | Rodniansky | |
| 2018/0060603 A1 | 3/2018 | Ahmed et al. | |
| 2018/0121110 A1 * | 5/2018 | Sawhney | G06F 3/0685 |
| 2018/0196955 A1 * | 7/2018 | Dageville | G06F 16/256 |
| 2018/0285559 A1 | 10/2018 | Branco et al. | |
| 2018/0357444 A1 | 12/2018 | Kammath et al. | |
| 2019/0188408 A1 | 6/2019 | Glik et al. | |
| 2021/0224409 A1 * | 7/2021 | Avanes | G06F 16/27 |
| 2022/0229925 A1 | 7/2022 | Avanes et al. | |

FOREIGN PATENT DOCUMENTS

| | | |
|---|---|---|
| CN | 108475271 | 8/2018 |
| CN | 110192189 | 8/2019 |
| CN | 113508383 A | 10/2021 |
| WO | WO-2021/146057 A1 | 7/2021 |

OTHER PUBLICATIONS

"U.S. Appl. No. 16/745,922, Non-Final Office Action dated Mar. 23, 2020", 25 pgs.

"U.S. Appl. No. 16/745,922, Notice of Allowance dated Mar. 18, 2022", 18 pgs.

"U.S. Appl. No. 16/745,922, Response filed Jun. 23, 2020 to Non-Final Office Action dated Mar. 23, 2020", 23 pgs.

"U.S. Appl. No. 17/657,578, Non-Final Office Action dated Jun. 2, 2022", 15 pgs.

"U.S. Appl. No. 17/657,578, Notice of Allowance dated Sep. 22, 2022", 8 pgs.

"U.S. Appl. No. 17/657,578, Response filed Sep. 2, 2022 to Non-Final Office Action dated Jun. 2, 2022", 12 pgs.

"International Application Serial No. PCT/US2020/070339, International Preliminary Report on Patentability dated Jul. 28, 2022", 7 pgs.

"International Application Serial No. PCT/US2020/070339, International Search Report dated Aug. 26, 2020", 2 pgs.

"International Application Serial No. PCT/US2020/070339, Written Opinion dated Aug. 26, 2020", 5 pgs.

"U.S. Appl. No. 18/056,489, Non Final Office Action dated Apr. 13, 2023", 16 pages.

"U.S. Appl. No. 18/056,489, Response filed May 31, 2023 to Non Final Office Action dated Apr. 13, 2023", 9 pages.

"Chinese Application Serial No. 202080007708.3, Office Action dated Aug. 3, 2023", with machine English translation, 14 pages.

* cited by examiner

200

210 — FUTURE GRANT TABLE

| SCHEMA | PRIVILEGE | OBJECT TYPE | CREATOR ROLE | PRIVILEGE ROLE | ACTIVE |
|---|---|---|---|---|---|
| S | INSERT | TABLE | ROLE1 | ROLE4 | TRUE |
| S | SELECT | VIEW | ALL | ROLE5 | FALSE |
| T | NO-XFER | TABLE | ALL | N/A | TRUE |

220 — column headers
230A, 230B, 230C — rows

240 — USER TABLE

| USER | ROLE | TENANT | SCHEMA |
|---|---|---|---|
| KARA | ROLE1 | BUSINESS1 | S |
| LARA | ROLE2 | BUSINESS1 | S |
| MARLON | ROLE1 | BUSINESS2 | T |
| MERA | ROLE3 | BUSINESS2 | T |

250 — column headers
260A, 260B, 260C, 260D — rows

270 — GRANT TABLE

| SCHEMA | SOURCE | PRIVILEGE | OBJECT | ROLE |
|---|---|---|---|---|
| S | M/A | INSERT | TABLE1 | ROLE4 |
| S | OWNER | SELECT | VIEW1 | ROLE2 |
| S | OWNER | M/G | N/A | ADMIN |
| S | ADMIN | CREATE | N/A | ROLE1 |
| T | M/A | EXECUTE | FUNCTION1 | ROLE3 |

280 — column headers
290A, 290B, 290C, 290D, 290E — rows

*FIG. 2*

CONTAINER-CENTRIC ACCESS CONTROL ON DATABASE OBJECTS

CROSS-REFERENCE TO RELATED APPLICATIONS

This application is a Continuation of U.S. patent application Ser. No. 17/657,578, filed Mar. 31, 2022, which is a Continuation of U.S. patent application Ser. No. 16/745,922, filed Jan. 17, 2020, now issued as U.S. Pat. No. 11,372,995, the contents of which are incorporated herein by reference in their entireties.

TECHNICAL FIELD

The present disclosure generally relates to special-purpose machines that manage databases, and to the technologies by which such special-purpose machines become improved compared to other special-purpose machines for managing access control on objects in databases.

BACKGROUND

Data can be uploaded to a database and access to the database data can be managed by a database administrator. More recently cloud database services have risen in popularity due to the ease with which new database instances can be created to store data. While the new cloud database services allow databases to be easily created, the cloud database services create new issues with regard to data privacy. For instance, it can be difficult to create access for specific individuals to specific data within a given database in a way that is both secure and scalable as the amount of data increases.

BRIEF DESCRIPTION OF THE DRAWINGS

Various ones of the appended drawings merely illustrate example embodiments of the present disclosure and should not be considered as limiting its scope.

FIG. 2 shows an example database architecture for implementing container-centric managed access control on database objects, according to some example embodiments.

DETAILED DESCRIPTION

Figure 1:
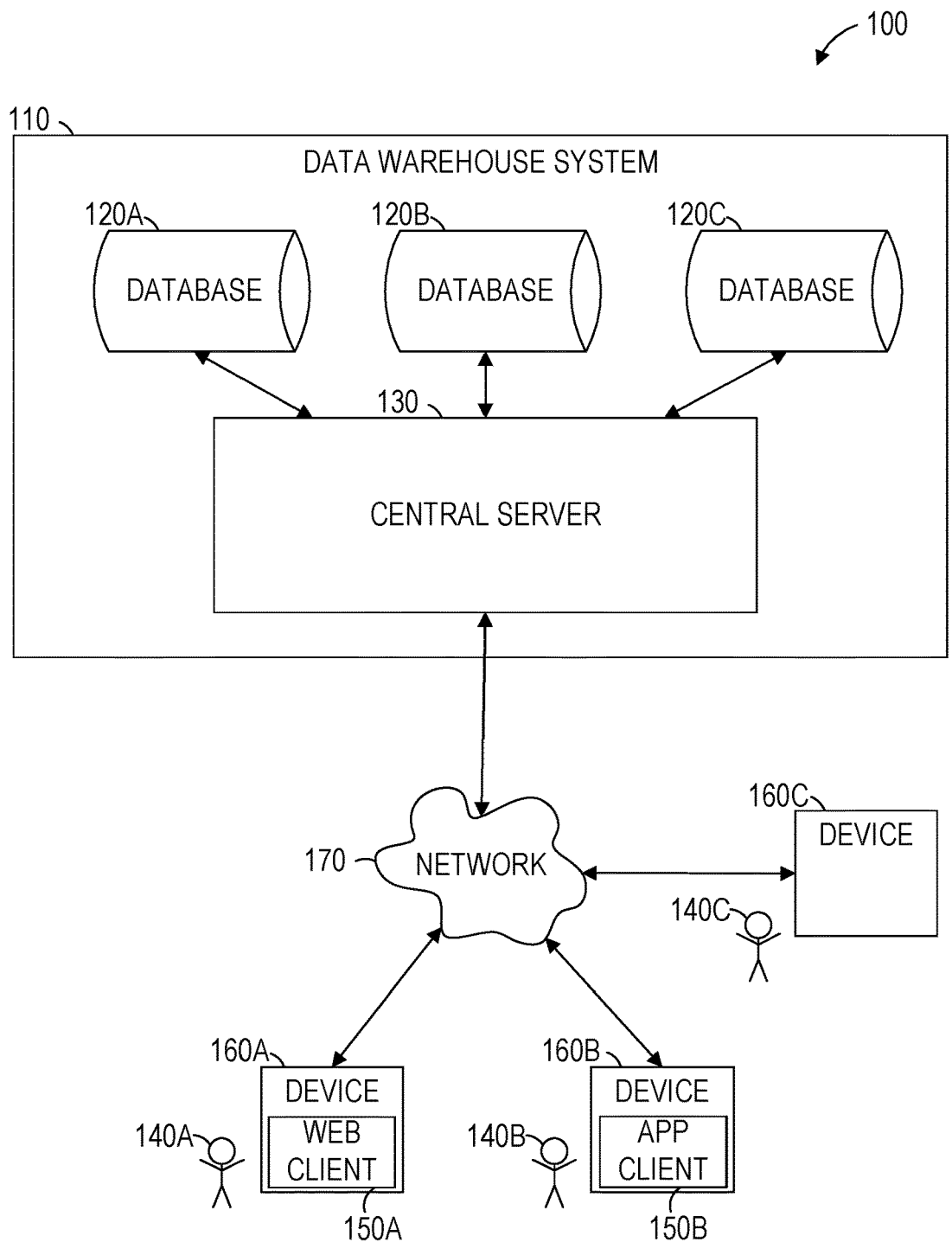
FIG. 1 illustrates an example computing environment in which a network-based data warehouse system can implement container-centric managed access control on database objects, according to some example embodiments.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail Grant inheritance allows specification of grants in a container level to be applied to database objects that are created in the future. As used herein, a container holds database objects. Example containers include a database and a schema. This reduces the operational overhead resulting from executing a set of grant statements after the creation of each object in the container. For homogeneous objects (i.e., objects in a container with an identical set of grants), access policy review for the homogeneous objects can be very efficient since review of the future grants for the homogeneous objects can be performed in place of review of the grants of each of the homogeneous objects.

Using container-centric managed access, an administrator is enabled to define a set of privileges that will be applied to database objects created in the future. Each such privilege may be referred to as a "future grant." When a user creates a database object, the system checks the future grants to determine if any apply to the user, the database object, or the combination. Any applicable future grants are applied to the database object before the user is allowed to modify it. As a result, the administrator is enabled to control the privileges associated with the database object even before the database object is created. As used herein, the term "database object" refers to any object in a database that is used to store or reference data. Example database objects include tables, views, functions, clusters, sequences, and indexes.

Without container-centric managed access, a user that creates a database object is the owner of the database object and has, at the time of creation, full control over the database object. Thus, the user can modify the database object, transfer ownership of the database object to another user, deny access to the database object by other users, delete the database object, or any suitable combination thereof. As a result, an administrator may have control over which users are enabled to create database objects, but not have control over what a user is able to do with a database object once created. This could result, for example, in a user with creation privileges creating a database object and transferring the created object to an account without creation privileges, at least partially bypassing the intended control. Using container-centric managed access, control over even as-yet-uncreated database objects is provided.

In traditional databases, access to the database objects are mediated by discretionary access control (DAC) in which the individual object owner decides who can access the object. By contrast, in container-centric managed access control (CcMAC), an owner of the container, (e.g., the administrator of a database or schema), decides who can access which objects in the container. Thus, with CcMAC, an organization can implement an access control mechanism for a multi-tenant cloud data warehouse where a container (e.g., a database or schema) can be created for each tenant, such that the owner role of the container will act as the security administrator of the tenant and is responsible for determining which users can exercise which operations on which objects. In CcMAC, the individual object owner is only responsible for the operational aspect of the objects (e.g., populating data, creating views, or any suitable combination thereof).

FIG. 1 illustrates an example computing environment 100 in which a network-based data warehouse system 110 can implement container-centric managed access control on database objects, according to some example embodiments. To avoid obscuring the inventive subject matter with unnecessary detail, various functional components that are not germane to conveying an understanding of the inventive subject matter have been omitted from the figures. However, a skilled artisan will readily recognize that various additional functional components may be included as part of the computing environment 100 to facilitate additional functionality that is not specifically described herein.

As shown, the computing environment 100 comprises the network-based data warehouse system 110 and computing devices 160A, 160B, and 160C, all connected via a network 170. The data warehouse system 110 includes a central server 130 and databases 120A, 120B, and 120C. The data warehouse system 110 is a network-based system used for storing and accessing data (e.g., internally storing data, accessing external remotely located data) in an integrated manner, and reporting and analyzing the integrated data. The data warehouse system 110 may be implemented on a cloud computing platform comprising a plurality of computing machines that provides on-demand computer system resources such as data storage and computing power to the network-based data warehouse system 110.

The computing devices 160A-160C each comprises one or more computing machines that execute a remote software component 150A or 150B to provide functionality to users 140A, 140B, and 140C of the network-based data warehouse system 110. For convenience, the computing devices 160A-160C may be referred to generically as a device 160 or in the aggregate as devices 160. Similarly, the remote software components 150A-150B may be referred to specifically as a web client 150A and an application (app) client 150B; in the aggregate as remote software components 150; or generically as a remote software component 150. The web client 150A operates within a web browser. The app client 150B is a stand-alone application.

Each remote software component 150 comprises a set of machine-readable instructions (e.g., code) that, when executed by the computing device 160, cause the computing device 160 to provide certain functionality. The remote software component 150 may operate on input data and generate result data based on processing, analyzing, or otherwise transforming the input data. As an example, the remote software component 150 can be an application used by an administrator to define future grants, an application used by a user to create database objects subject to the future grants, or any suitable combination thereof.

The central server 130 enables administrative users to manage access to resources and services provided by the network-based data warehouse system 110. Administrative users can create and manage users, roles, and groups; use privileges to allow or deny access to resources and services; and define future grants that apply to later-created database objects. The central server 130 can store share data that securely manages shared access to the storage resources of the network-based data warehouse system 110 amongst different users.

The central server 130 is also coupled to databases 120A-120C, which are associated with the entirety of data stored by the network-based data warehouse system 110. The databases 120A-120C store data pertaining to various functions and aspects associated with the network-based data warehouse system 110 and its users. For example, each of the databases 120A-120C may store data for a different tenant of the network-based data warehouse system 110, including data for future grants. A tenant is a set of users who share access to data, such that no tenant can access data of another tenant absent explicit authorization to do so.

In some example embodiments, each of the databases 120A-120C is stored in a cloud computing platform. For example, each of the databases 120A-120C may be stored on data storage devices in a public cloud infrastructure or a private cloud infrastructure. The data storage devices may be hard disk drives (HDDs), solid state drives (SSDs), storage clusters, Amazon S3® storage systems or any other data storage technology. Additionally, the data storage devices may include distributed file systems (such as Hadoop Distributed File Systems (HDFS)), object storage systems, and the like.

Though shown as using a single central server 130, network-based data warehouse system 110 may comprise a plurality of compute nodes (e.g., virtual warehouses). A set of processes on a compute node executes a query plan to execute database queries. As used herein, the term "database query" refers to all database commands, not merely those that seek to retrieve data. Thus, an administrator's command to create a future grant and a user's command to create a database object are both "database queries."

In some example embodiments, communication links between elements of the network-based data warehouse system 110 are implemented via one or more data communication networks. These data communication networks may utilize any communication protocol and any type of communication medium. In some example embodiments, the data communication networks are a combination of two or more data communication networks (or sub-networks) coupled to one another. These communication links may be implemented using any type of communication medium and any communication protocol.

In various example embodiments, one or more portions of the network 170 may be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 170 or a portion of the network 170 may include a wireless or cellular network, and the coupling between the network 170, the devices 160, and the central server 130 may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE)

technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The data storage devices storing the databases 120A-120C are, in some example embodiments, decoupled from the computing resources associated with the network-based data warehouse system 110. Thus, new virtual warehouses can be created and terminated in the network-based data warehouse system 110 and additional data storage devices can be created and terminated in the network-based data warehouse system 110 in an independent manner. This architecture supports dynamic changes to the network-based data warehouse system 110 based on the changing data storage and retrieval needs as well as the changing needs of the users and systems accessing the network-based data warehouse system 110. The support of dynamic changes allows the network-based data warehouse system 110 to scale quickly in response to changing demands. The decoupling of the computing resources from the data storage devices supports the storage of large amounts of data without requiring a corresponding large amount of computing resources. Similarly, this decoupling of resources supports a significant increase in the computing resources utilized at a particular time without requiring a corresponding increase in the available data storage resources. Additionally, the decoupling of resources enables different accounts to handle creating additional compute resources to process data shared by other users without affecting the other user's systems. For instance, a data provider may have three compute resources and share data with a data consumer, and the data consumer may generate new compute resources to execute queries against the shared data, where the new compute resources are managed by the data consumer and do not affect or interact with the compute resources of the data provider.

The central server 130, databases 120A-120C, and computing devices 160A-160C are shown in FIG. 1 as individual components. However, each of the central server 130, databases 120A-120C, and computing devices 160A-160C may be implemented as a distributed system (e.g., distributed across multiple systems/platforms at multiple geographic locations) connected by APIs and access information (e.g., tokens, login data). Additionally, each of the central server 130, databases 120A-120C, and computing devices 160A-160C can be scaled up or down (independently of one another) depending on changes to the requests received and the changing needs of the network-based data warehouse system 110. Thus, in the described embodiments, the network-based data warehouse system 110 is dynamic and supports regular changes to meet the current data processing needs.

FIG. 2 shows an example database architecture 200 for implementing container-centric managed access control on database objects, according to some example embodiments. The database architecture 200 comprises a future grant table 210, a user table 240, and a grant table 270. The future grant table 210 contains rows 230A, 230B, and 230C, each containing data in a format 220. The user table 240 contains rows 260A, 260B, 260C, and 260D, each containing data in a format 250. The grant table 270 contains rows 290A, 290B, 290C, 290D, and 290E each containing data in a format 280.

In some example embodiments, the network-based data warehouse system 110 implements role-based access control to govern access to objects in customer accounts. The role-based access control consists of two mechanisms: roles and grants. In one embodiment, roles are special objects in an end-user account (e.g., provider account, consumer account) that are assigned to users. Grants between roles and database objects define what privileges a role has on these objects. For example, a role that has a usage grant on a database can "see" this database when executing the command "show databases"; a role that has a select grant on a table can read from this table but not write to the table. A role with a modify grant on the table is able to write to it.

Each of the rows 230A-230C of the future grant table 210 identifies the schema, object type, and creating role to which the future grant applies; the privilege granted by the future grant; the role to which the privilege is granted; and whether the future grant is active. Thus, the row 230A indicates that future tables created in schema S by ROLE1 will be created with the INSERT privilege for ROLE4. The row 230B indicates that the future grant is inactive. If the future grant of the row 230B were active, it would cause future views created in schema S by all roles to be created with the SELECT privilege for ROLE5, guaranteeing that users with the role ROLE5 will have the right to access data through all future views.

The row 230C of the future grant table 210 provides that all tables created by any role in the schema S are non-transferable. Since this is a negative grant that takes away a default privilege of the creator of a database object and there is no account or role to give a positive privilege to, the privilege role is NULL or N/A (not applicable). Preventing the transfer of ownership of database objects may be a useful security measure, since it ensures that the owner of a database object is always the creator of the database object. Additionally, preventing the transfer of ownership of a database object may ensure that ownership of the database object is not transferred to a user with a different role that has greater privileges and may be able to modify or delete privileges on the database object that were created through managed grant.

Each of the rows 260A-260D of the user table 240 identifies the role, tenant, and schema for a user account. Thus, the row 260A shows that the user Kara, an account of the tenant BUSINESS1, has the role ROLE1 in the schema S. The row 260B shows that the user Lara, also an account of the tenant BUSINESS1, has the role ROLE2 in the schema S; the row 260C shows that the user Marlon, an account of the tenant BUSINESS2, has the role ROLE1 in the schema T; and the row 260D shows that the user Mera, another account of the tenant BUSINESS2, has the role ROLE3 in the schema T.

The grant table 270, in each of the rows 290A-290E, identifies the privileges for existing objects. Thus, the row 290A indicates that the role ROLE1 in the schema S has the INSERT privilege for the database object TABLE1, a table. The row 290B indicates that the role ROLE2 in the schema S has the SELECT privilege for the database object VIEW1, a view; the row 290C indicates that the role ADMIN in the schema S has a manage grant privilege for schema S; the row 290D indicates that ROLE1 has the create object privilege for schema S; and the row 290E indicates that the role ROLE3 has the EXECUTE privilege for the database object FUNCTION1, a function in the schema T. The rows in the grant table 270 may be created in response to a command that operates on an existing database object received from an administrator (indicated by ADMIN) or a database object owner (indicated by OWNER). Alternatively, one or more rows in the grant table 270 may be created in response to the creation of a database object based on data in the future grant table 210 at the time the database object is created (indicated by M/A). The source of the grant is indicated by the source column of the grant table 270.

With role-based access control, it is possible to grant usage from one role to another role. A role that has a usage grant to another role "inherits" all access privileges of the other role. For example, a role ROLE4 in the schema S may have a usage grant on the role ROLE1. Accordingly, a user with activated role ROLE4 would have the INSERT privilege on TABLE1 since ROLE1 is granted that privilege in the row 290A.

The database architecture 200 shows data related to the control of database objects stored in the databases 120A, 120B, and 120C. Each of the databases 120A-120C consists of one or more schemas (e.g., the schema S or the schema T). A schema is a groups of database objects, such as tables that store data (e.g., TABLE1 and TABLE2), views that provide access to data stored in one or more tables (e.g., VIEW1), functions that provide access to or modify data stored in one or more tables (e.g., FUNCTION1), and shares.

In tables, the data is relational database data structured as collections of columns and rows, where tables can include references to other tables (e.g., keys, indices, or shared columns such as consumer name). For instance, the user table 240 comprises three columns (user name, role, and schema) with a row for each user, and the grant table 270 comprises five columns (schema, source, privilege, object, and role) where the role/schema pair are used to reference a particular role/schema as a primary key. For instance, a join operation or view can be created from the user table 240 and the grant table 270 to show privileges for a particular user (e.g., by creating a view or new table joining the tables on the role and schema columns and providing the user column of the user table 240 with the privilege and object columns of the grant table 270). Although relational database structures are discussed here as examples, it is appreciated that in some example embodiments the data managed by the network-based data warehouse system 110 can be data structured in a non-relational database format (e.g., no-SQL, Hadoop, Spark frames, or others).

As used herein, a view is a database object that displays data from one or more tables (e.g., displaying certain columns from each of the one or more tables). A view allows the result of a query to be accessed as if the view is itself a table. While views can be utilized to exclude or hide columns to "mask" the data, hiding data using views creates another object that must be managed, and if in a given network environment there are many items to be masked, a large amount of views must be managed, which creates significant overhead and management complexity. Additionally, hiding data using views for masking is agnostic to which roles see the view (e.g., user engineer sees the same view as the analyst user). Additionally, the views merely create a data object view and do not perform data transformation style operations (e.g., replace first three characters of a name with hashtags). Furthermore, sharing views can compromise network security, as the recipient of the view may be able to gain access to the underlying data used to create the view (e.g., access the full table from which columns were pulled to create a given view).

As used herein, a share is an object that is custom to the network-based data warehouse system 110 that can be used to share data between users of the network-based data warehouse system 110 in an efficient and secure manner. A share object comprises all information used to share a given database. Each share includes privileges that grant access to the databases and schema containing the objects to share, the privileges that grant access to specific objects (e.g., tables and secure views), and the consumer accounts with which the database and its objects are shared. After a given database is created (e.g., by the user 140A of a first customer account) the shared objects can be made available for access and/or manipulation by other users (e.g., by the user 140C of a second customer account) via the network-based data warehouse system 110. For example, the account of the user 140A can create one or more database instances and then load data into the database 120A, create views and/or shared objects, and further create consumer accounts (e.g., reader accounts) that can access the database objects via the network-based data warehouse system 110 and no data needs to be transferred between the accounts; instead, the shared data is accessed directly on the originating storage device. For instance, the account of the user 140C can log in using a browser to access a page, generate a read-only database (e.g., "consumerDatabase"), and populate the shared data (e.g., "view3") in the database for analysis without having to copy data from the storage device that stores the shared data of the database 120A.

Figure 3:
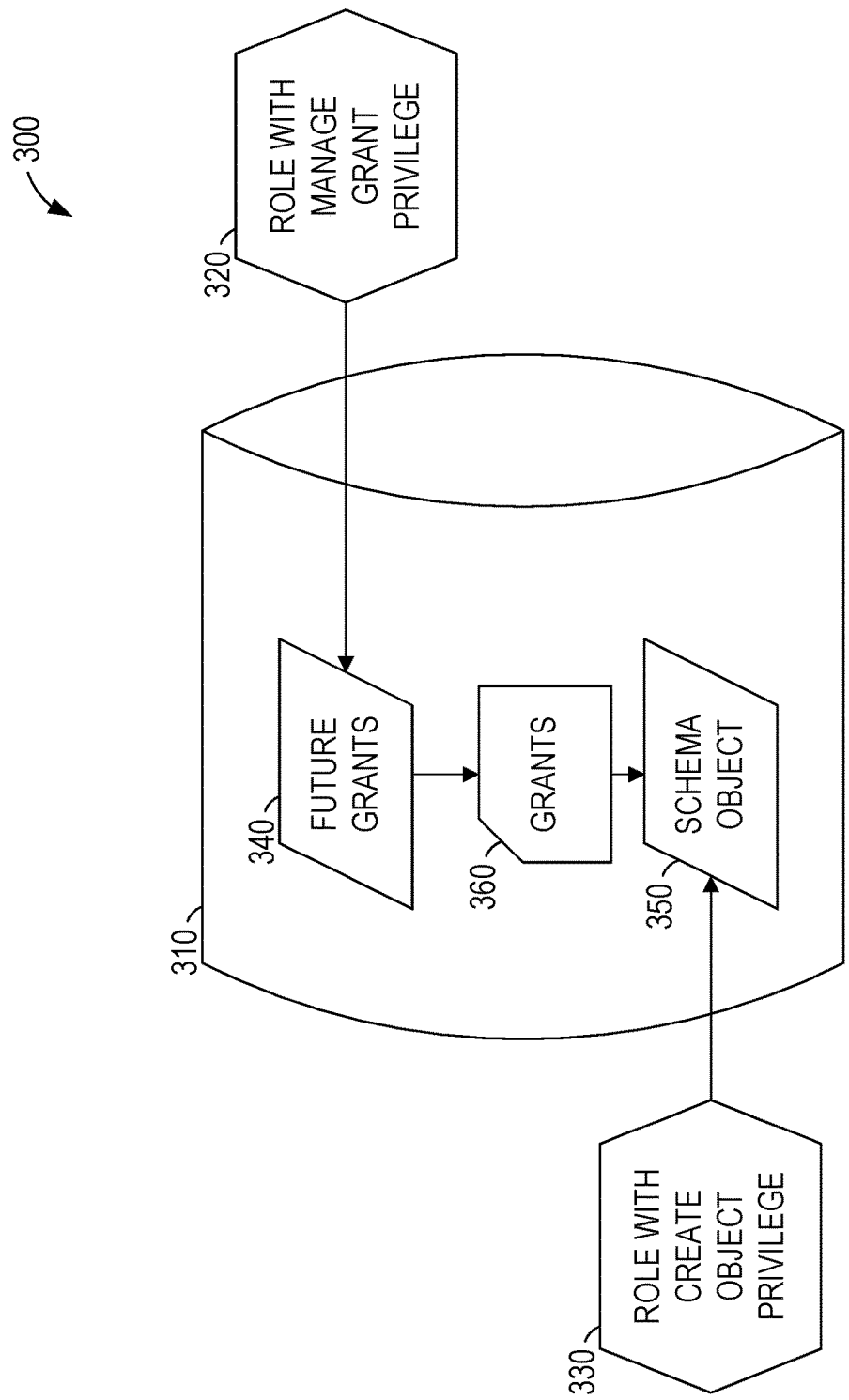
FIG. 3 is a block diagram illustrating interactions between roles and schema objects in a database using container-centric managed access control on database objects, according to some example embodiments.

FIG. 3 is a block diagram 300 illustrating interactions between roles 320 and 330 and schema objects 340, 350, and 360 in a database 310 using container-centric managed access control on database objects, according to some example embodiments.

A user with the role 320 having a manage grant privilege creates one or more future grants 340. For example, rows may be added to the future grant table 210. Subsequently, a user with the role 330 having a create object privilege creates a schema object 350 (e.g., a table). During the creation of the schema object 350, the future grants 340 are instantiated into actual grants 360 (e.g., rows in the grant table 270), which apply to the schema object 350.

A user account can create or delete future grants in a schema, so long as the user account has activated a role with the manage grants privilege. An example command to create a future grant is:

grant all on future tables in schema s to role r with grant option;

This command grants all rights on all future tables in schema s to role r. The "with grant option" clause indicates that the future grant is enabled as soon as it is created (e.g., the Active column in an added row of the future grant table 210 is set to TRUE). The future grants can be deleted using the example command:

revoke all on future tables in schema s from role r;

This command revokes the future grants on future tables, but has no effect on existing grants, even if those grants were created due to the now-revoked future grants.

In some example embodiments, future grants are implemented using a data persistent object ("DPO"), e.g., a FutureGrantDPO. By way of example, the DPO definition below is provided.

```
@DPOEntity (
    schemaVersion = 1,
    slices =
    {
        @DPOSlice(name = PRIMARY_SLICE,
            keys =
            {
```

-continued

```
        "securableAccountId",
        "securableType",
        "securableId",
        "targetSecurableType",
        "targetSecurablePriv"
      },
      values =
      {
        "granteeAccountId",
        "grantOption",
        "createdBy",
        "createdOn"
      }
    ),
    @DPOSlice(name = BY_GRANTEE_SLICE,
      keys =
      {
        "granteeAccountId",
        "securableType",
        "securableId",
        "targetSecurableType",
        "targetSecurablePriv"
      },
      values =
      {
        "securableAccountId",
        "grantOption",
        "createdBy",
        "createdOn"
      }
    ),
    @DPOSlice(name = CHANGELOG_SLICE,
      keys =
      {
        "modifiedOn",
        "deletedOn",
        "jobId",
        "securableAccountId",
        "securableType",
        "securableId",
        "granteeRoleId",
        "targetSecurableType",
        "targetSecurablePriv"
      },
      values =
      {
        "grantOption",
        "createdBy",
        "createdOn"
      }
    )
  }
)
```

In the structure above, the PRIMARY_SLICE and CHANGELOG_SLICE are system-level slices and the BY_GRANTEE_SLICE is a separate slice created for each account that is granted managed access. In each slice, the keys element defines the unique combination of keys used to store or retrieve the values. Thus, in the PRIMARY_SLICE, the combination of six values of securableAccountId, securableType, securableId, targetSecurableType, targetSecurablePriv, and granteeRoleId uniquely define the four values of granteeAccountId, grantOption, createdBy, and createdOn. The different slices access the same underlying data.

In each slice, securableAccountId is an identifier of the account or role to which the future grant applies; securableType indicates if the future grant applies to a single schema or an entire database; securableId is the identifier of the specific schema or database being secured; targetSecurableType indicates the type of database object to which the future grant applies (e.g., tables, functions, views, or any suitable combination thereof); targetSecurablePriv indicates the privilege being granted (e.g., SELECT); granteeAccountId identifies the account or role to which the privilege is granted; and grantOption is a Boolean value that is TRUE if the future grant is active and FALSE if the future grant is inactive.

Additionally, createdBy indicates the account that created the future grant; createdOn indicates the date and time at which the future grant was created; modifiedOn indicates the date and time at which the future grant was modified; deletedOn indicates the date and time at which the future grant was deleted; and jobId indicates the identifier of the job that modified or deleted the future grant.

Figure 4:
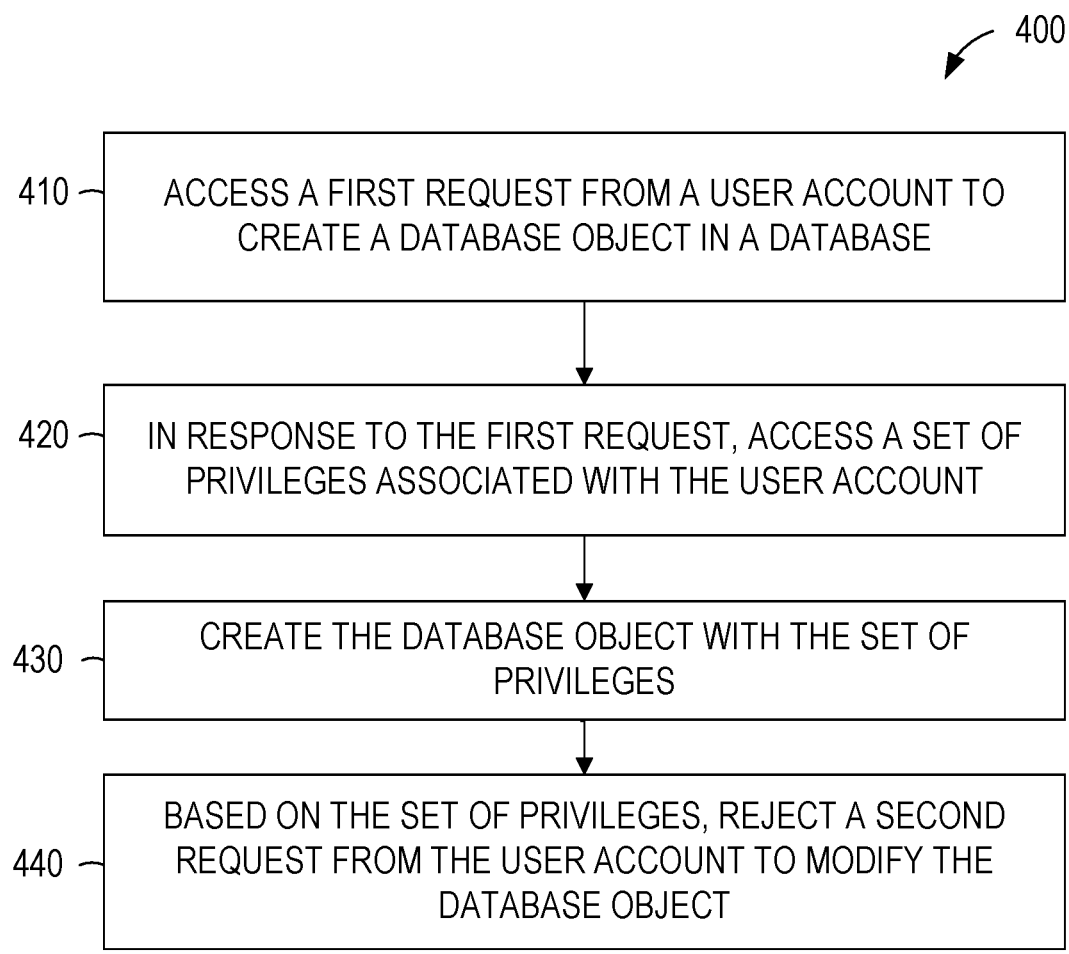
FIG. 4 is a flow diagram of a method for implementing container-centric managed access control on database objects, according to some example embodiments.

FIG. 4 is a flow diagram of a method 400 for implementing container-centric managed access control on database objects, according to some example embodiments. The method 400 includes the operations 410, 420, 430, and 440. By way of example and not limitation, the method 400 is described as being performed by the data warehouse system 110 of FIG. 1 and the computer system 800 of FIG. 8.

In operation 410, the central server 130 accesses a first request from a user account to create a database object in a database. As an example, the web client 150A transmits a request from a user account associated with the user 140A (the user account "KARA") to the central server 130 via the network 170, the request to create a table (the table "TABLE1") in the database 120A. The request may be received by the database module 870 via the communication interface 835.

The central server 130, in operation 420, accesses, in response to the first request, a set of privileges associated with the user account. In this example, the access control module 860 accesses the future grant table 210 to determine the set of privileges associated with the role of the user account "KARA" by joining the user table 240 with the future grant table 210 on the schema and role/creator role columns. KARA's role is ROLE1 on the schema S and the future grant table 210 provides for database objects created using this role to have the privilege of INSERT for ROLE4.

The central server 130 creates the database object with the set of privileges (operation 430). In this example, the table TABLE1 is created by the database module 870 in the database 120A. KARA owns the table and the row 290A is added to the grant table 270, indicating that the role ROLE4 has the INSERT privilege on TABLE1.

In operation 440, the central server 130, based on the set of privileges, rejects a second request from the user account to modify the database object. For example, the KARA account requests to remove the INSERT privilege for ROLE4 on TABLE1, but since the row 290A indicates that the source of the privilege is "M/A," or managed access, KARA's request to remove the privilege is rejected. In some example embodiments, other requests from KARA to modify the database object that do not modify grants that resulted from managed access are accepted.

Figure 5:
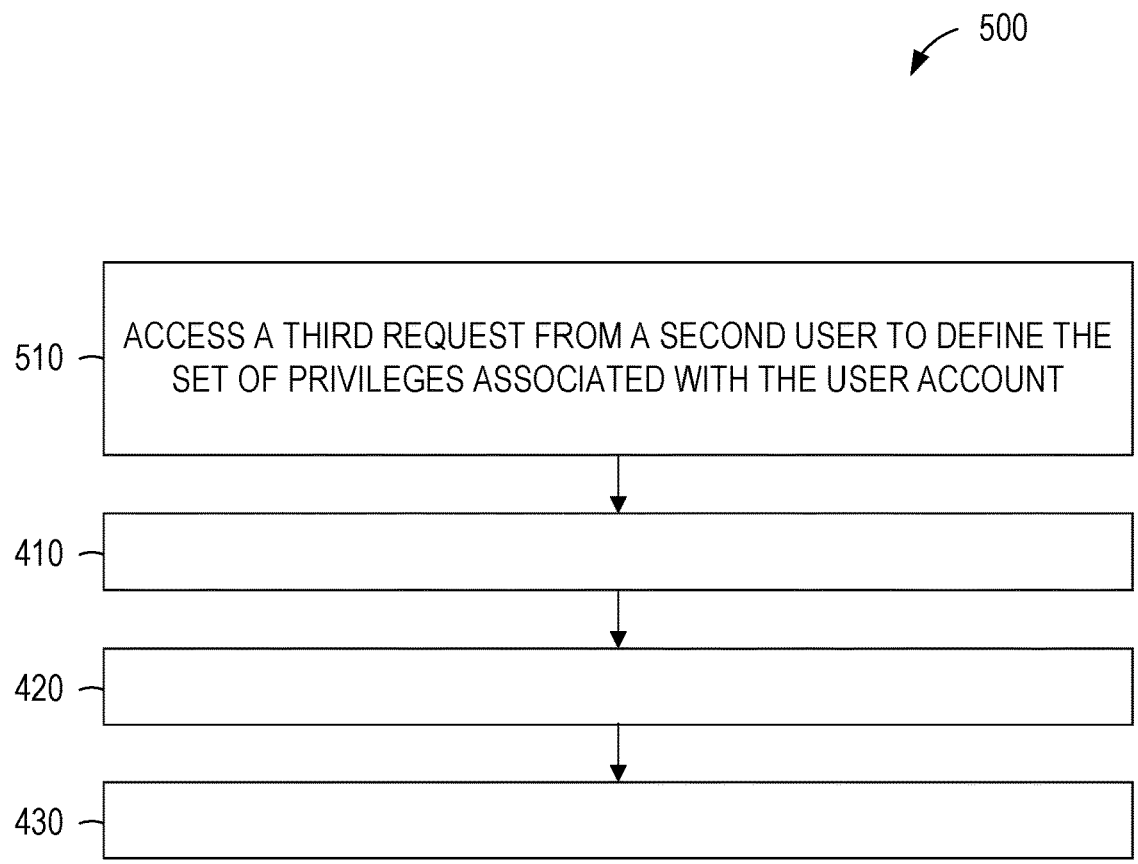
FIG. 5 is a flow diagram of a method for implementing container-centric managed access control on database objects, according to some example embodiments.

FIG. 5 is a flow diagram of a method 500 for implementing container-centric managed access control on database objects, according to some example embodiments. The method 500 includes the operation 510 and the operations 410-430 of the method 400. By way of example and not limitation, the method 500 is described as being performed by the data warehouse system 110 of FIG. 1 and the computer system 800 of FIG. 8.

In operation 510, the central server 130 accesses a third request from a second user to define the set of privileges (later accessed in operation 420) associated with the user account. For example, the user 140C may use an account with the ADMIN role identified in the row 290C of the grant table 270 to send a command that creates the row 230A of the future grant table 210. As indicated in the row 290C, the ADMIN role has the manage grant privilege on schema S. Thus, the access control module 860 permits the account to create, modify, and delete rows from the future grant table 210 that pertain to the schema S. Later, when the user KARA creates a database object of type table in schema S, matching the criteria specified in the future grant stored in the row 230A, the privilege role ROLE4 is granted the privilege INSERT, resulting in the row 290A. Accounts lacking the manage access privilege for the schema S are prevented from creating, modifying, or deleting rows from the future grant table 210 that pertain to the schema S.

In some example embodiments, the third request comprises an identifier of the user account, an identifier of a role, a type of the database object, the set of privileges, or any suitable combination thereof. In some example embodiments, one or more of the identifier of the user account, the identifier of the role, and the type of the database object may be a wildcard or pattern that matches multiple accounts, roles, or database types. Thus, the third request may define a privilege that applies to all database objects created by a particular user, all database objects created by a particular role, a particular type of database object created by any user, a particular type of database object created by a particular role, or any other combination of accounts, roles, and database object types.

The manage grant privilege may be schema-specific, as illustrated in the row 290C, showing that the ADMIN account has the manage grant privilege on the schema S but not on other schemas (e.g., the schema T). Alternatively, the manage grant privilege may apply to multiple schemas in a database (e.g., the database 120A) or in the network-based data warehouse system 110. A command from a user account to define a set of privileges on a schema or database for which the account (e.g., via the role associated with the account) does not have the manage grant privilege is rejected.

Thus, a database object created by an account being administered by the ADMIN account is in a first schema (schema S) of the database; the ADMIN account is associated with a first privilege to define privileges on database objects in the first schema of the database (per the row 290C); and the ADMIN account is not associated with a second privilege to define privileges on database objects in a second schema (schema T) of the database (as neither the row 290C nor any other row of the grant table 270 grants such a privilege to the ADMIN account).

Figure 6:
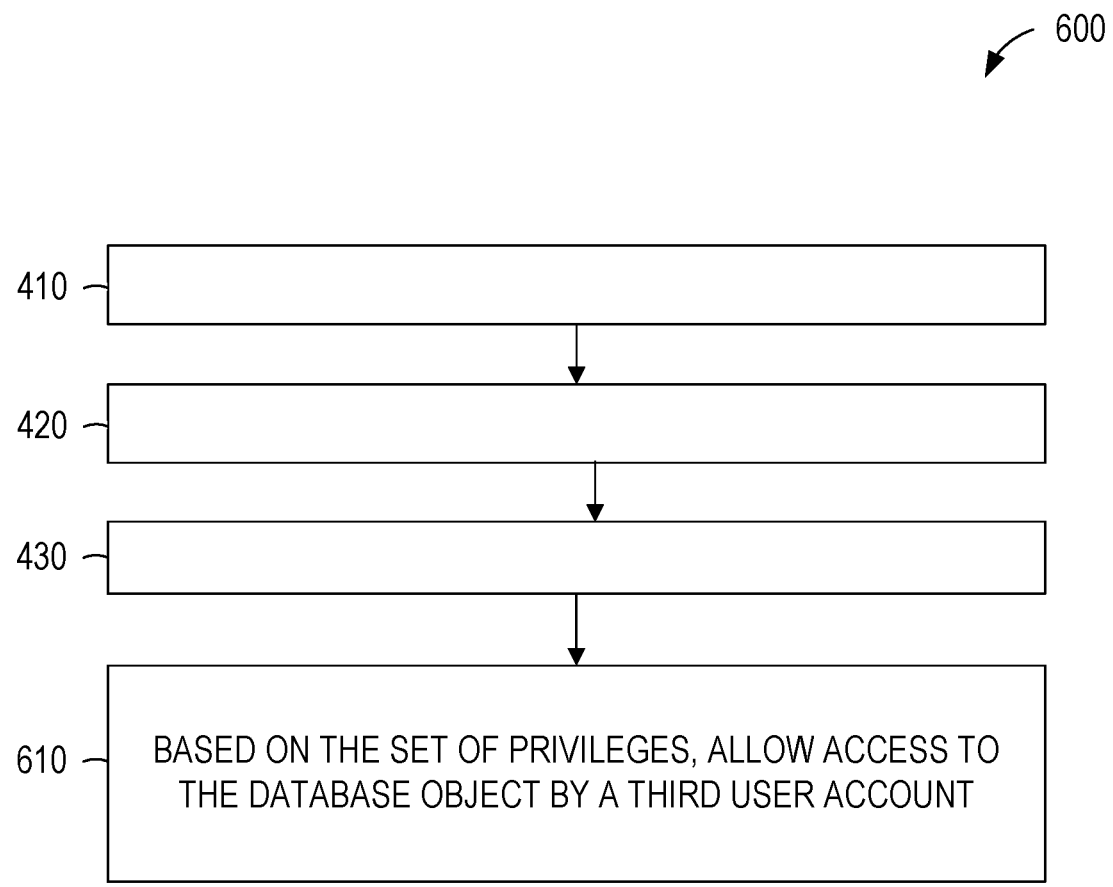
FIG. 6 is a flow diagram of a method for implementing container-centric managed access control on database objects, according to some example embodiments.

FIG. 6 is a flow diagram of a method 600 for implementing container-centric managed access control on database objects, according to some example embodiments. The method 600 includes the operations 410-430 of the method 400 and operation 610. By way of example and not limitation, the method 600 is described as being performed by the data warehouse system 110 of FIG. 1 and the computer system 800 of FIG. 8.

After the database object is created with the set of privileges in operation 430, the central server 130, in operation 610, allows access to the database object by a third user account based on the set of privileges. For example, based on the grant of the INSERT privilege to ROLE4 on the table created by KARA in operation 420, an account with ROLE4 is permitted to insert data into the table.

Though described as separate methods each making use of operations 410-430, the methods 400-600 may be combined to include two or more of operations 440, 510, and 610. Conventionally, a user with the privilege to create database objects has control of the privileges associated with the created objects. This conventional approach is problematic, at least because some roles (e.g., roles used by managers) should have access to all data but should not have administrator privileges on the database itself.

To address the foregoing, the network-based data warehouse system 110 uses future grants that are not modifiable by the owner of an object (absent a managed access privilege) to cause database objects created by user accounts to be created with the specified privilege grants. The future grant table 210 can specify creator roles and how database objects created by those roles can be interacted with by users having different roles. In this way, the users of the network-based data warehouse system 110 can comply with a tenant's data-access policies automatically.

Figure 7:
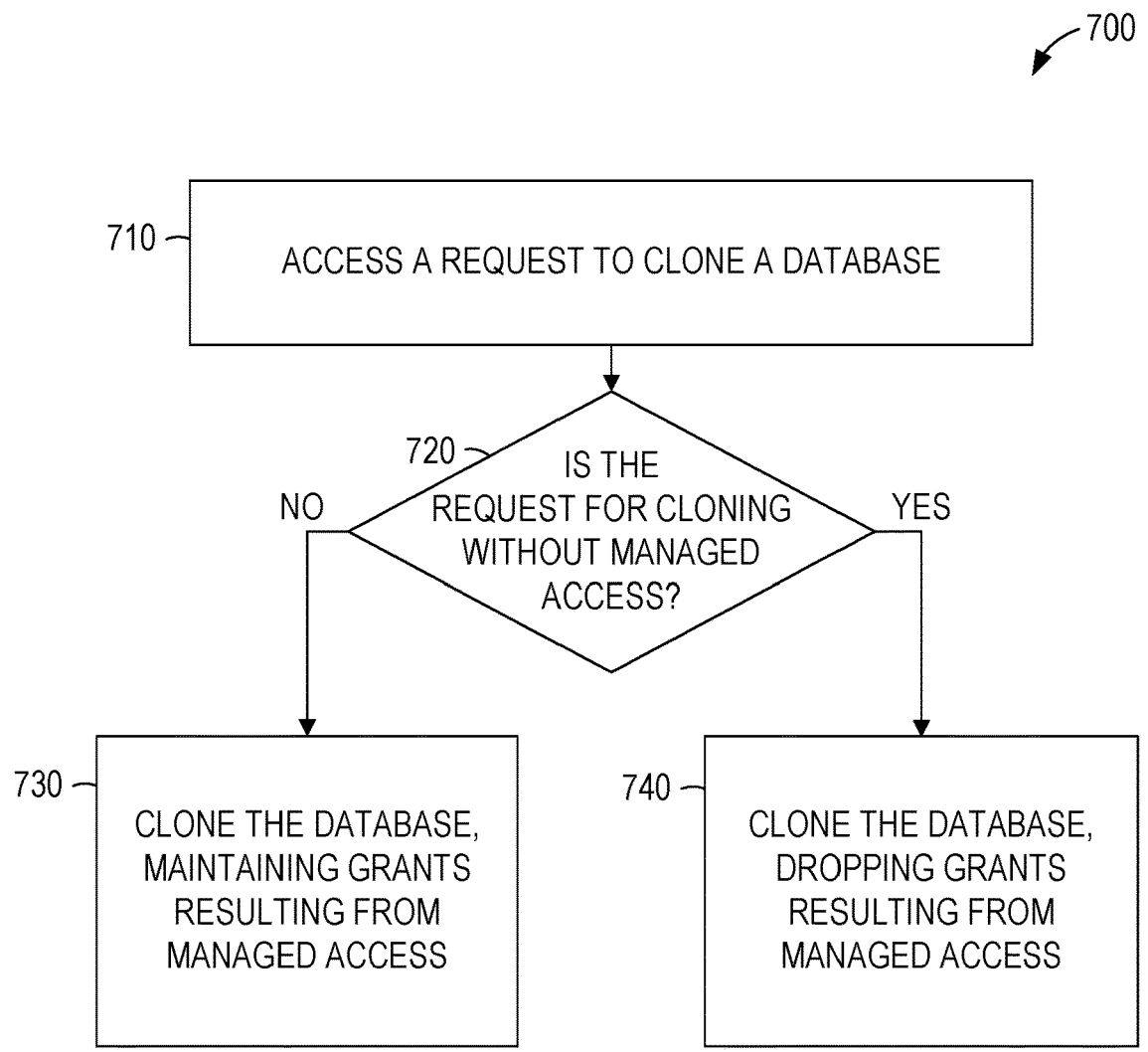
FIG. 7 is a flow diagram of a method for implementing container-centric managed access control on database objects, according to some example embodiments.

FIG. 7 is a flow diagram of a method for implementing container-centric managed access control on database objects, according to some example embodiments. The method 700 includes the operations 710, 720, 730, and 740. By way of example and not limitation, the method 700 is described as being performed by the data warehouse system 110 of FIG. 1 and the computer system 800 of FIG. 8.

In operation 710, the central server 130 accesses a request to clone a database. Cloning a database makes an additional copy of all data stored in the database, allowing the original database and the clone of the database to be independently modified. In some example embodiments, the central server 130 allows or denies a request to clone a database based on a privilege associated with a role of the account making the request.

The central server 130, in operation 720, determines if the request is for cloning without managed access. If the request is to create a clone of the database, wherein the clone does not have container-centric managed access, the method 700 proceeds with operation 740. However, if the request is to create a clone of the database, wherein the clone does have container-centric managed access, the method 700 proceeds with operation 730.

In operation 730, the central server 130 clones the database, maintaining grants resulting from managed access. For example, any rows in the grant table 270, including those having container-centric managed access as the source, are copied for the clone. Likewise, any rows in the future grant table 210 pertaining to the cloned database are copied for the clone.

Alternatively, in operation 740, the central server 130 clones the database, dropping grants resulting from container-centric managed access. For example, only rows in the grant table 270 having a source other than container-centric managed access are copied for the clone and no rows in the future grant table 210 are copied for the clone.

Other database operations also interact with grants resulting from container-centric managed access. In various example embodiments: renaming a database object from one schema to another copies the grants from the first schema to the second; cloning data between two schemas copies the data but not the grants; and a "clone with copy grant" command clones the data and copies the grants.

Figure 8:
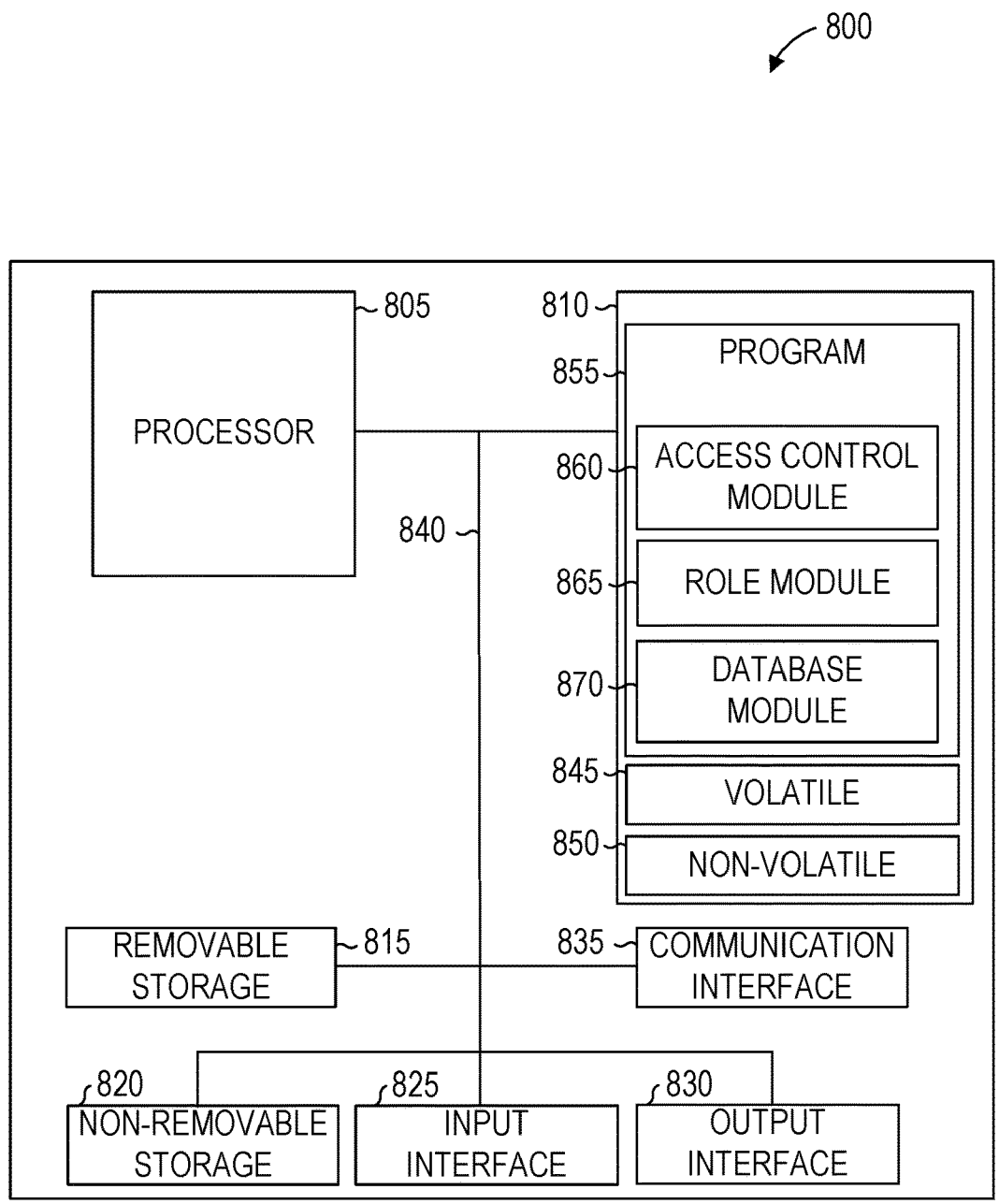
FIG. 8 illustrates a diagrammatic representation of a machine in the form of a computer system within which a set of instructions may be executed for causing the machine to perform any one or more of the methodologies discussed herein, in accordance with some embodiments of the present disclosure.

FIG. 8 illustrates a diagrammatic representation of a machine in the form of a computer system 800 within which a set of instructions may be executed for causing the machine to perform any one or more of the methodologies discussed herein, in accordance with some embodiments of the present disclosure. All components need not be used in various embodiments. For example, clients (e.g., the devices 160A-160C), servers (e.g., the central server 130), autonomous systems, and cloud-based network resources (e.g., the databases 120A-120C) may each use a different set of components, or, in the case of servers for example, larger storage devices.

The computer system 800 includes a processor 805, a computer-storage medium 810, removable storage 815, and non-removable storage 820, all connected by a bus 840. Although the example computing device is illustrated and described as the computer system 800, the computing device may be in different forms in different embodiments. For example, the computing system 800 may instead be a smartphone, a tablet, a smartwatch, or another computing device including elements the same as or similar to those illustrated and described with regard to FIG. 8. Devices such as smartphones, tablets, and smartwatches are collectively referred to as "mobile devices." Further, although the various data storage elements are illustrated as part of the computer 800, the storage may also or alternatively include cloud-based storage accessible via a network, such as the Internet, or server-based storage.

The processor 805 may be a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof. The term "processor" is intended to include multi-core processors that may comprise two or more independent processors (sometimes referred to as "cores") that may execute instructions contemporaneously. Although FIG. 8 shows a single processor 805, the computer system 800 may include a single processor with a single core, a single processor with multiple cores (e.g., a multi-core processor), multiple processors with a single core, multiple processors with multiple cores, or any combination thereof.

The computer-storage medium 810 includes volatile memory 845 and non-volatile memory 850. The volatile memory 845 or the non-volatile memory 850 stores a program 855. The computer 800 may include, or have access to, a computing environment that includes a variety of computer-readable media, such as the volatile memory 845, the non-volatile memory 850, the removable storage 815, and the non-removable storage 820. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions embodying any one or more of the methodologies or functions described herein. The instructions may also reside, completely or partially, within the processor 805 (e.g., within the processor's cache memory) during execution thereof by the computer system 800.

The computer system 800 includes or has access to a computing environment that includes an input interface 825, an output interface 830, and a communication interface 835. The output interface 830 interfaces to or includes a display device, such as a touchscreen, that also may serve as an input device. The input interface 825 interfaces to or includes one or more of a touchscreen, a touchpad, a mouse, a keyboard, a camera, one or more device-specific buttons, one or more sensors integrated within or coupled via wired or wireless data connections to the computer system 800, and other input devices. The computer system 800 may operate in a networked environment using the communication interface 835 to connect to one or more remote computers, such as database servers. The remote computer may include a personal computer (PC), server, router, network PC, peer device or other common network node, or the like. The communication interface 835 may connect to a local-area network (LAN), a wide-area network (WAN), a cellular network, a WiFi network, a Bluetooth network, or other networks.

Computer instructions stored on a computer-storage medium (e.g., the program 855 stored in the computer-storage medium 810) are executable by the processor 805 of the computer system 800. As used herein, the terms "machine-storage medium," "device-storage medium," and "computer-storage medium" (referred to collectively as "machine-storage medium") mean the same thing and may be used interchangeably. The terms refer to a single or multiple storage devices and/or media (e.g., a centralized or distributed key-value store, and/or associated caches and servers) that store executable instructions and/or data, as well as cloud-based storage systems or storage networks that include multiple storage apparatus or devices. The terms shall accordingly be taken to include, but not be limited to, solid-state memories, and optical and magnetic media, including memory internal or external to processors 805. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate array (FPGA), and flash memory devices; magnetic disks such as internal hard disks and removable disks; magneto-optical disks; and CD-ROM and DVD-ROM disks. The terms "machine-storage media," "computer-storage media," and "device-storage media" specifically exclude carrier waves, modulated data signals, and other such media, at least some of which are covered under the term "signal medium" discussed below.

The term "signal medium" or "transmission medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and signal media. Thus, the terms include both storage devices/media and carrier waves/modulated data signals.

The program 855 may further be transmitted or received over the networks 170 using a transmission medium via the communication interface 835 and utilizing any one of a number of well-known transfer protocols (e.g., HTTP). Examples of networks 170 include a local area network (LAN), a wide area network (WAN), the Internet, mobile telephone networks, plain old telephone service (POTS) networks, and wireless data networks (e.g., WiFi, LTE, and WiMAX networks). The term "transmission medium" shall be taken to include any intangible medium that is capable of storing, encoding, or carrying instructions for execution by the computer system 800, and includes digital or analog communications signals or other intangible media to facilitate communication of such software.

The program 855 is shown as including an access control module 860, a role module 865, and a database module 870. Any one or more of the modules described herein may be implemented using hardware (e.g., a processor of a machine, an application-specific integrated circuit (ASIC), an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The access control module 860 of the central server 130 controls access to data in the databases 120A-120C. For example, the devices 160A and 160C may be associated with a single tenant identifier and provide data to the network-based data warehouse system 110 for storage in one or more of the databases 120A-120C. The access control module 860 allows the user accounts associated with the tenant to access the stored data and prevent other user accounts (e.g., an account of the user 140C associated with a different tenant) from accessing the data. While in some example embodiments a tenant corresponds to a client device, more commonly multiple client devices are assigned to a single tenant identifier.

The role module 865 determines which role corresponds to an account and what privileges the role has. Based on the privileges for the role, the central server 130 allows or prevents access, modification, creation, or deletion of data in one or more of the databases 120A-120C.

The database module 870 communicates with the databases 120A-120C. For example, in response to a SELECT query from the device 160A for data stored in the database 120A, the database module 870 requests data from the database 120A, receives the requested data, and provides the data to the devices 160A via the communication interface 835 and the network 170.

In alternative embodiments, the computer system 800 operates as a standalone device or may be coupled (e.g., networked) to other machines. In a networked deployment, the computer system 800 may operate in the capacity of a server machine or a client machine in a server-client network environment, or as a peer machine in a peer-to-peer (or distributed) network environment. The computer system 800 may comprise, but not be limited to, a server computer, a client computer, a personal computer (PC), a tablet computer, a laptop computer, a netbook, a smart phone, a mobile device, a network router, a network switch, a network bridge, or any machine capable of executing instructions of the program 855, sequentially or otherwise, that specify actions to be taken by the computer system 800. Further, while only a single computer system 800 is illustrated, the term "machine" shall also be taken to include a collection of computer systems 800 that individually or jointly execute the instructions to perform any one or more of the methodologies discussed herein.

The input interface 825 and the output interface 830 include components to receive input, provide output, produce output, transmit information, exchange information, capture measurements, and so on. The specific input/output ("I/O") components that are included in a particular computer system 800 will depend on the type of computer system. For example, portable devices such as mobile phones will likely include a touch input device or other such input mechanisms, while a headless server machine will likely not include such a touch input device. It will be appreciated that the I/O components may include many other components that are not shown in FIG. 8. The input interface 825 may interface with visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input interface 825 may interface with alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the methods 400, 500, 600, and 700 may be performed by one or more processors. The performance of certain of the operations may be distributed among the one or more processors, not only residing within a single machine, but also deployed across a number of machines. In some example embodiments, the processor or processors may be located in a single location (e.g., within a home environment, an office environment, or a server farm), while in other embodiments the processors may be distributed across a number of locations.

Although the embodiments of the present disclosure have been described with reference to specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

The following numbered examples are embodiments:

Example 1: A system comprising:
one or more processors; and
a memory storing instructions that, when executed by the one or more processors, cause the one or more processors to perform operations comprising:
accessing a first request from a user account to create a database object in a database;
in response to the first request, accessing a set of privileges associated with the user account;
creating the database object with the set of privileges; and
based on the set of privileges, rejecting a second request from the user account to modify the database object.

Example 2: The system of example 1, wherein the operations further comprise:
before the accessing of the first request, accessing a third request from a second user account to define the set of privileges associated with the user account.

Example 3. The system of example 2, wherein the third request comprises an identifier of the user account, a type of the database object, and the set of privileges.

Example 4: The system of example 2 or example 3, wherein:
the database object is in a first schema of the database;
the second user account is associated with a first privilege to define privileges on database objects in the first schema of the database; and
the second user account is not associated with a second privilege to define privileges on database objects in a second schema of the database.

Example 5: The system of any of examples 1 to 4, wherein the set of privileges associated with the user account comprises a set of privileges associated with a role associated with the user account.

Example 6: The system of any of examples 1 to 5, wherein the set of privileges comprises an access right to the database object for a second user account.

Example 7: The system of any of examples 1 to 6, wherein the set of privileges prohibits transfer of ownership of the database object from the user account.

Example 8: The system of any of examples 1 to 7, further comprising:
accessing a request to clone a first database schema that comprises the database object; and
in response to the request, creating a second database schema that comprises a copy of the database object without the set of privileges.

Example 9: The system of any of examples 1 to 8, further comprising:

accessing a request to clone a first database schema that comprises the database object; and
in response to the request, creating a second database schema that comprises a copy of the database object with the set of privileges.

Example 10: A method comprising:
accessing, by a database server, a first request from a user account to create a database object in a database;
in response to the first request, accessing, by the database server, a set of privileges associated with the user account;
creating the database object with the set of privileges; and
based on the set of privileges, rejecting a second request from the user account to modify the database object.

Example 11: The method of example 10, further comprising:
before the accessing of the first request, accessing a third request from a second user account to define the set of privileges associated with the user account.

Example 12: The method of example 11, wherein the third request comprises an identifier of the user account, a type of the database object, and the set of privileges.

Example 13: The method of example 11 or example 12, wherein:
the database object is in a first schema of the database;
the second user account is associated with a first privilege to define privileges on database objects in the first schema of the database; and
the second user account is not associated with a second privilege to define privileges on database objects in a second schema of the database.

Example 14: The method of any of examples 10 to 13, wherein the set of privileges associated with the user account comprises a set of privileges associated with a role associated with the user account.

Example 15: The method of any of examples 10 to 14, wherein the set of privileges comprises an access right to the database object for a second user account.

Example 16: The method of any of examples 10 to 15, wherein the set of privileges prohibits transfer of ownership of the database object from the user account.

Example 17: The method of any of examples 10 to 16, further comprising:
accessing a request to clone a first database schema that comprises the database object; and
in response to the request, creating a second database schema that comprises a copy of the database object without the set of privileges.

Example 18: The method of any of examples 10 to 17, further comprising:
accessing a request to clone a first database schema that comprises the database object; and
in response to the request, creating a second database schema that comprises a copy of the database object with the set of privileges.

Example 19: A machine-readable storage device storing instructions that, when executed by one or more processors, cause the one or more processors to perform operations comprising:
accessing a first request from a user account to create a database object in a database;
in response to the first request, accessing a set of privileges associated with the user account;
creating the database object with the set of privileges; and
based on the set of privileges, rejecting a second request from the user account to modify the database object.

Example 20: The storage device of example 19, wherein the operations further comprise:
before the accessing of the first request, accessing a third request from a second user account to define the set of privileges associated with the user account.

Example 21: The storage device of example 19, wherein the third request comprises an identifier of the user account, a type of the database object, and the set of privileges.

Example 22: The storage device of example 20 or example 21, wherein:
the database object is in a first schema of the database;
the second user account is associated with a first privilege to define privileges on database objects in the first schema of the database; and
the second user account is not associated with a second privilege to define privileges on database objects in a second schema of the database.

Example 23: The storage device of any of examples 19 to 22, wherein the set of privileges associated with the user account comprises a set of privileges associated with a role associated with the user account.

Example 24: The system of any of examples 19 to 23, wherein the set of privileges comprises an access right to the database object for a second user account.

Example 25: The system of any of examples 19 to 24, wherein the set of privileges prohibits transfer of ownership of the database object from the user account.

Example 26: The system of any of examples 19 to 25, further comprising:
accessing a request to clone a first database schema that comprises the database object; and
in response to the request, creating a second database schema that comprises a copy of the database object without the set of privileges.

Example 27: The system of any of examples 19 to 26, further comprising:
accessing a request to clone a first database schema that comprises the database object; and
in response to the request, creating a second database schema that comprises a copy of the database object with the set of privileges.

What is claimed is:

1. A method comprising:
generating, by a first account, a database;
receiving, from a second account, a request to clone the database, the second account having a role that is different from a role of the first account;
determining an identifier of the second account;
using the identifier of the second account to determine the role of the second account stored in a user table;
in response to receiving the request to clone the database, generated by the first account, from the second account, accessing a privilege associated with the determined role of the second account;
retrieving, from a grant table, a grant associated with the accessed privilege of the second account, the grant table associating different roles with different privileges; and
controlling whether to permit or deny cloning of the database based on the grant associated with the accessed privilege retrieved from the grant table.

2. The method of claim 1, further comprising:
identifying, in the database, the grant table associated with the first account of the database, the grant table specifying a set of privileges for a database object type of the database, the set of privileges in the grant table comprising actions that can be performed by one or more user accounts on future database objects of the database object type.

3. The method of claim 2, further comprising:
receiving a request to create a new database object of the database object type in the database, the request associated with the second account of the database; and
accessing the grant table to identify the second user account and privileges associated with the second user account based on the new database object being of the database object type specified in the grant table.

4. The method of claim 3, further comprising:
based on the set of privileges in the grant table, creating the new database object in the database according to the privileges associated with the second account.

5. The method of claim 2, wherein the grant table received from the first account comprises: an identifier of a second account.

6. The method of claim 2, wherein the set of privileges comprises an access right to database objects of the database object type that are managed by the first account.

7. The method of claim 2, wherein the set of privileges prohibits transfer of ownership of database objects of the database object type from the first account.

8. The method of claim 1, further comprising:
accessing a further request to clone a first database schema that comprises a new database object; and
in response to the further request, creating a second database schema that comprises a copy of the new database object without a set of privileges.

9. The method of claim 1, further comprising:
accessing another request to clone a first database schema that comprises a new database object; and
in response to the another request, creating a second database schema that comprises a copy of the new database object with a set of privileges.

10. The method of claim 1, further comprising:
determining whether the request to clone the database is a request for cloning without managed access.

11. The method of claim 10, further comprising:
cloning the database maintaining grants resulting from managed access in response to determining that the request to clone the database is not a request without managed access.

12. The method of claim 10, further comprising:
cloning the database dropping grants resulting from managed access in response to determining that the request to clone the database is a request without managed access.

13. The method of claim 1, wherein the cloning of the database generates a cloned database, wherein the request to clone the database comprises a request to generate a copy of all data stored in the database, further comprising selecting between maintaining grants and dropping grants for the cloned database based on a defined set of privileges associated with the second account.

14. The method of claim 1, further comprising:
copying a first portion of the database associated with container-centric managed access while preventing copying of a second portion of the database associated with a future grant table.

15. A system comprising:
a memory; and
one or more processors configured to execute instructions stored in the memory for performing operations comprising:
generating, by a first account, a database;

receiving, from a second account, a request to clone the database, the second account having a role that is different from a role of the first account;

determining an identifier of the second account;

using the identifier of the second account to determine the role of the second account stored in a user table;

in response to receiving the request to clone the database, generated by the first account, from the second account, accessing a privilege associated with the determined role of the second account;

retrieving, from a grant table, a grant associated with the accessed privilege of the second account, the grant table associating different roles with different privileges; and controlling whether to permit or deny cloning of the database based on the grant associated with the accessed privilege retrieved from the grant table.

16. The system of claim 15, the operations further comprising:

identifying, in the database, the grant table associated with the first account of the database, the grant table specifying a set of privileges for a database object type of the database, the set of privileges in the grant table comprising actions that can be performed by one or more user accounts on future database objects of the database object type.

17. The system of claim 16, the operations further comprising:

receiving a request to create a new database object of the database object type in the database, the request associated with the second account of the database; and accessing the grant table to identify the second user account and privileges associated with the second user account based on the new database object being of the database object type specified in the grant table.

18. The system of claim 17, the operations further comprising:

based on the set of privileges in the grant table, creating the new database object in the database according to the privileges associated with the second account.

19. The system of claim 16, wherein the grant table received from the first account comprises: an identifier of a second account.

20. A machine-readable storage device storing instructions that, when executed by one or more processors, cause the one or more processors to perform operations comprising:

generating, by a first account, a database;

receiving, from a second account, a request to clone the database, the second account having a role that is different from a role of the first account;

determining an identifier of the second account;

using the identifier of the second account to determine the role of the second account stored in a user table;

in response to receiving the request to clone the database, generated by the first account, from the second account, accessing a privilege associated with the determined role of the second account;

retrieving, from a grant table, a grant associated with the accessed privilege of the second account, the grant table associating different roles with different privileges; and controlling whether to permit or deny cloning of the database based on the grant associated with the accessed privilege retrieved from the grant table.

\* \* \* \* \*

UNITED STATES PATENT AND TRADEMARK OFFICE
CERTIFICATE OF CORRECTION

PATENT NO. : 11,841,969 B2
APPLICATION NO. : 18/057878
DATED : December 12, 2023
INVENTOR(S) : Avanes et al.

Page 1 of 1

It is certified that error appears in the above-identified patent and that said Letters Patent is hereby corrected as shown below:

In the Claims

In Column 20, Line 17, in Claim 5, after "comprises:", insert a linebreak

In Column 22, Line 9, in Claim 19, after "comprises:", insert a linebreak

Signed and Sealed this
Eighteenth Day of February, 2025

Coke Morgan Stewart
*Acting Director of the United States Patent and Trademark Office*